US010480478B2

(12) United States Patent
Henson et al.

(10) Patent No.: US 10,480,478 B2
(45) Date of Patent: Nov. 19, 2019

(54) DIAGNOSTIC TECHNIQUES FOR A CLUTCH INTERLOCK SWITCH AND A CLUTCH PEDAL POSITION SENSOR

(71) Applicants: Scott E Henson, Chelsea, MI (US); Craig A Alcock, Tecumseh, MI (US); Dhaval D Shah, Rochester Hills, MI (US)

(72) Inventors: Scott E Henson, Chelsea, MI (US); Craig A Alcock, Tecumseh, MI (US); Dhaval D Shah, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 45 days.

(21) Appl. No.: 15/959,944

(22) Filed: Apr. 23, 2018

(65) Prior Publication Data

US 2019/0323471 A1    Oct. 24, 2019

(51) Int. Cl.

| F02N 11/08 | (2006.01) |
|---|---|
| F16H 63/42 | (2006.01) |
| F02N 11/04 | (2006.01) |
| F16H 63/50 | (2006.01) |

(52) U.S. Cl.
CPC .......... *F02N 11/0825* (2013.01); *F02N 11/04* (2013.01); *F16H 63/42* (2013.01); *F16H 63/50* (2013.01); *F16H 2063/426* (2013.01)

(58) Field of Classification Search
CPC ...... F02N 11/0825; F02N 11/04; F02N 11/10; F02N 11/101; F02N 11/103; F16H 63/42; F16H 63/50; F16H 2063/426
USPC ...... 123/179.3, 179.4; 701/52, 67, 112, 113, 701/107
See application file for complete search history.

(56) References Cited

U.S. PATENT DOCUMENTS

| 8,855,897 B2 | 10/2014 | Kawamoto et al. |
|---|---|---|
| 2005/0247280 A1 | 11/2005 | Asada et al. |
| 2007/0261653 A1 | 11/2007 | Yagyu |
| 2010/0057332 A1 | 3/2010 | Katoh et al. |

*Primary Examiner* — Hai H Huynh
(74) *Attorney, Agent, or Firm* — Ralph E. Smith

(57) ABSTRACT

A control system for a vehicle having an engine with an electronic stop-start (ESS) system and a manual transmission and a diagnostic method for a clutch pedal position sensor configured to output a voltage indicative of a level of depression of a clutch pedal that is configured to control engagement and disengagement of a clutch assembly of the manual transmission and a clutch interlock switch configured to output an on/off state indicative of a position of the clutch pedal relative to a fully-depressed position each utilize a controller configured to correlate the output voltage of the clutch pedal position sensor and the on/off state of the clutch interlock switch to detect a malfunction of the clutch pedal position sensor or the clutch interlock switch, and disable the ESS system when the malfunction of the clutch pedal position sensor or the clutch interlock switch is detected.

14 Claims, 4 Drawing Sheets

DIAGNOSTIC TECHNIQUES FOR A CLUTCH INTERLOCK SWITCH AND A CLUTCH PEDAL POSITION SENSOR

FIELD

The present application generally relates to vehicle manual transmissions and, more particularly, to diagnostic techniques for a clutch interlock switch and a clutch pedal position sensor.

BACKGROUND

A manual transmission is manually operated by a driver of a vehicle to control a gear ratio for transferring drive torque from an engine to a driveline. The driver operates a clutch pedal that in turn controls engagement/disengagement of a clutch assembly (a clutch disc and a pressure plate) in the manual transmission. A clutch interlock switch detects contact with the clutch pedal and outputs an on/off state. The on state of the clutch interlock switch is indicative of a fully-depressed clutch. When the clutch interlock switch is in the off state, the engine is prevented from starting because the clutch pedal is assumed to not be fully-depressed. When a false malfunction of the clutch interlock switch is detected, however, the engine could potentially inadvertently be prevented from starting. This potential scenario could be undesirable for vehicles equipped with an electronic stop-start (ESS) system that repeatedly stops and starts the engine. Accordingly, while such manual transmission systems do work for well their intended purpose, there remains a need for improvement in the relevant art.

SUMMARY

According to one example aspect of the invention, a control system for a vehicle having an engine with an electronic stop-start (ESS) system and a manual transmission is presented. In one exemplary implementation, the control system comprises: a clutch pedal position sensor configured to output a voltage indicative of a level of depression of a clutch pedal that is configured to control engagement and disengagement of a clutch assembly of the manual transmission, a clutch interlock switch configured to output an on/off state indicative of a position of the clutch pedal relative to a fully-depressed position, and a controller configured to: correlate the output voltage of the clutch pedal position sensor and the on/off state of the clutch interlock switch to detect a malfunction of the clutch pedal position sensor or the clutch interlock switch, and disable the ESS system when the malfunction of the clutch pedal position sensor or the clutch interlock switch is detected.

In some implementations, the controller is configured to correlate the output voltage of the clutch pedal position sensor and the on/off state of the clutch interlock switch by: determining a first on/off state of the clutch interlock switch when the output voltage of the clutch pedal position sensor exceeds a first voltage threshold indicative of a depressed clutch pedal for a first period, determining a second on/off state of the clutch-interlock switch when the output voltage of the clutch pedal position sensor falls below a second voltage threshold indicative of a released clutch pedal for a second period, and detecting the malfunction of the clutch interlock switch when the first detected state of the clutch interlock switch is an off state or the second detected state of the clutch interlock switch is an on state.

In some implementations, the controller is configured to correlate the output voltage of the clutch pedal position sensor and the on/off state of the clutch interlock switch by: determining a maximum output voltage of the clutch pedal position sensor when the clutch interlock switch is in an on state for a first period, determining a minimum output voltage of the clutch pedal position sensor when the clutch interlock switch is in an off state for a second period, calculating a difference between the maximum and minimum output voltages of the clutch pedal position sensor, and detecting the malfunction of the clutch pedal position sensor when the calculated difference is less than a difference threshold. In some implementations, the ESS system comprises a belt-driven starter generator (BSG) unit including an electric motor-generator powered by a battery system, wherein the electric motor-generator is coupled to and configured to drive a crankshaft of the engine to start the engine.

In some implementations, the controller is configured to disable the ESS system prior to an auto-stop of the engine to prevent a failed auto-start of the engine due to the detected malfunction of the clutch pedal position sensor or the clutch interlock switch. In some implementations, when the malfunction of the clutch pedal position sensor or the clutch interlock switch is detected during an auto-stop of the engine and while the manual transmission is in neutral, the controller is configured to disable the ESS system after an auto-start of the engine. In some implementations, when the malfunction of the clutch pedal position sensor or the clutch interlock switch is detected during the auto-stop of the engine and while the manual transmission is not in neutral, the controller is configured to instruct a driver of the vehicle to shift the manual transmission into neutral before the auto-start of the engine and subsequent disabling of the ESS system are performed.

According to another example aspect of the invention, a diagnostic method for a clutch pedal position sensor and a clutch interlock switch of a vehicle having an engine with an ESS system and a manual transmission is presented. In one exemplary implementation, the method comprises: receiving, by a controller and from a clutch pedal position sensor, an output voltage indicative of a level of depression of a clutch pedal that is configured to control engagement and disengagement of a clutch assembly of the manual transmission, receiving, by the controller and from a clutch interlock switch, an on/off state indicative of a position of the clutch pedal relative to a fully-depressed position, correlating, by the controller, the output voltage of the clutch pedal position sensor and the on/off state of the clutch interlock switch to detect a malfunction of the clutch pedal position sensor or the clutch interlock switch, and disabling, by the controller, the ESS system when the malfunction of the clutch pedal position sensor or the clutch interlock switch is detected.

In some implementations, correlating the output voltage of the clutch pedal position sensor and the on/off state of the clutch interlock switch further comprises: determining, by the controller, a first on/off state of the clutch interlock switch when the output voltage of the clutch pedal position sensor exceeds a first voltage threshold indicative of a depressed clutch pedal for a first period, determining, by the controller, a second on/off state of the clutch-interlock switch when the output voltage of the clutch pedal position sensor falls below a second voltage threshold indicative of a released clutch pedal for a second period, and detecting, by the controller, the malfunction of the clutch interlock switch when the first detected state of the clutch interlock switch is an off state or the second detected state of the clutch interlock switch is an on state.

In some implementations, correlating the output voltage of the clutch pedal position sensor and the on/off state of the clutch interlock switch further comprises: determining, by the controller, a maximum output voltage of the clutch pedal position sensor when the clutch interlock switch is in an on state for a first period, determining, by the controller, a minimum output voltage of the clutch pedal position sensor when the clutch interlock switch is in an off state for a second period, calculating, by the controller, a difference between the maximum and minimum output voltages of the clutch pedal position sensor, and detecting, by the controller, the malfunction of the clutch pedal position sensor when the calculated difference is less than a difference threshold. In some implementations, the ESS system comprises a BSG unit including an electric motor-generator powered by a battery system, wherein the electric motor-generator is coupled to and configured to drive a crankshaft of the engine to start the engine.

In some implementations, the disabling of the ESS system comprises disabling, by the controller, the ESS system prior to an auto-stop of the engine to prevent a failed auto-start of the engine due to the detected malfunction of the clutch pedal position sensor or the clutch interlock switch. In some implementations, the disabling of the ESS system comprises when the malfunction of the clutch pedal position sensor or the clutch interlock switch is detected during an auto-stop of the engine and while the manual transmission is in neutral, disabling, by the controller, the ESS system after an auto-start of the engine. In some implementations, the disabling of the ESS system comprises when the malfunction of the clutch pedal position sensor or the clutch interlock switch is detected during the auto-stop of the engine and while the manual transmission is not in neutral, instructing, by the controller, a driver of the vehicle to shift the manual transmission into neutral before the auto-start of the engine and subsequent disabling of the ESS system are performed.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As mentioned above, when a false malfunction of a clutch interlock switch is detected, an engine could inadvertently be prevented from starting. This could be particularly problematic for vehicles equipped with an electronic stop-start (ESS) system that repeatedly stops and starts the engine. Accordingly, improved diagnostic techniques for both the clutch interlock switch and a clutch pedal position sensor are presented. The benefits of these techniques are more accurate/robust diagnostics and preventing drivers from being inadvertently stranded, particularly for vehicles with ESS systems. The techniques correlate the outputs of the clutch interlock switch and the clutch pedal position sensor during vehicle operation to detect device malfunctions.

For the clutch interlock switch, the output voltage of the clutch pedal position sensor is utilized to identify instances where the clutch interlock switch is expected to be in on and off states. When there is a mismatch between the actual and expected states of the clutch interlock switch, a malfunction of the clutch interlock switch is detected. Conversely, for the clutch pedal position sensor, the output of the clutch interlock switch is utilized to identify instances where the clutch pedal is expected to be depressed and released. When a difference between a maximum and minimum output voltage of the clutch pedal position sensor during these instances is less than a threshold, a malfunction of the clutch pedal position sensor is detected. In some implementations, when there is a mismatch between the outputs of the clutch interlock switch and the clutch pedal position sensor, a correlation fault could be set, which is not indicative of which of the devices has faulted or malfunctioned. For example, one device could be stuck or the other device could be intermittently moving around. Alternatively, a device-specific fault or malfunction could be indicated.

Figure 1:
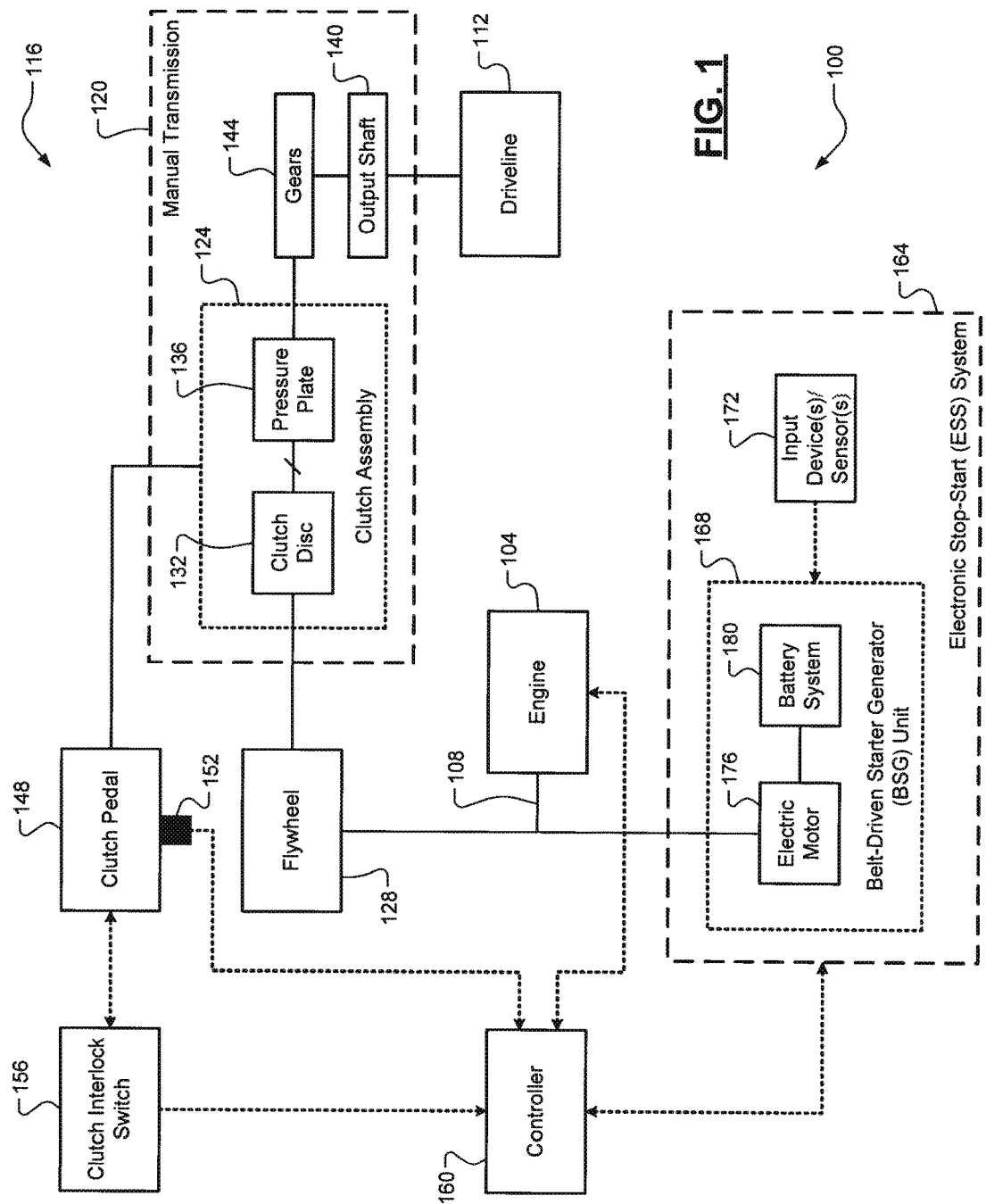
FIG. 1 is a functional block diagram of an example vehicle comprising an engine with an electronic stop-start (ESS) system and a manual transmission system according to the principles of the present disclosure.

Referring now to FIG. 1, a functional block diagram of an example vehicle 100 is illustrated. The vehicle 100 includes an engine 104 that combusts a mixture of air and fuel to drive pistons (not shown) that generate drive torque at a crankshaft 108. The drive torque is transferred from the crankshaft 108 to a driveline 112 of the vehicle 100 via a manual transmission system 116. A manual transmission 120 comprises a clutch assembly 124 that is engaged/disengaged with a flywheel 128 that is coupled to the crankshaft 108. More particularly, a clutch disc 132 coupled to the flywheel 132 is selectively engaged/disengaged with a pressure plate 136, which in turn is connected to an output shaft 140 via a system of gears 144 (e.g., a planetary gear set).

A clutch pedal 148 of the manual transmission system 116 is operated by a driver of the vehicle 100 to control the engagement/disengagement of the clutch disc 132 with the pressure plate 136. A clutch pedal position sensor 152 outputs a voltage indicative of a position of the clutch pedal 148 from fully-released to fully-depressed. In one exemplary implementation, the clutch pedal position sensor 152 is an analog variable resistance position sensor. A clutch interlock switch 156 outputs an on/off state indicative of a position of the clutch pedal 148 with respect to the fully-depressed position. In one exemplary implementation, the clutch interlock switch 156 is a contact sensor disposed at the fully-depressed position of the clutch pedal 148. A controller 160 receives the outputs of these devices 152, 156 and also controls operation of the vehicle 100, such as controlling the engine 104 to generate a desired output torque.

The vehicle 100 also includes an ESS system 164 for performing auto-stop and auto-start operations of the engine 104, as well as performing conventional start operations of the engine 104. The ESS system 164 comprises a belt-driven starter generator (BSG) unit 168 that operates as a torque generator or a torque consumer based on operating parameters provided by a set of input device(s)/sensor(s) 172. Non-limiting examples of these device(s)/sensor(s) 172 include a brake pedal sensor and vehicle and engine speed sensors. The BSG unit 168 comprises an electric motor-generator 176 that is powered by and also may recharge a battery system 180. While a BSG-type ESS system is disclosed herein, it will be appreciated that the vehicle 100 could include any suitable ESS system, such as an upgraded version of a conventional engine starter.

Figure 2A:
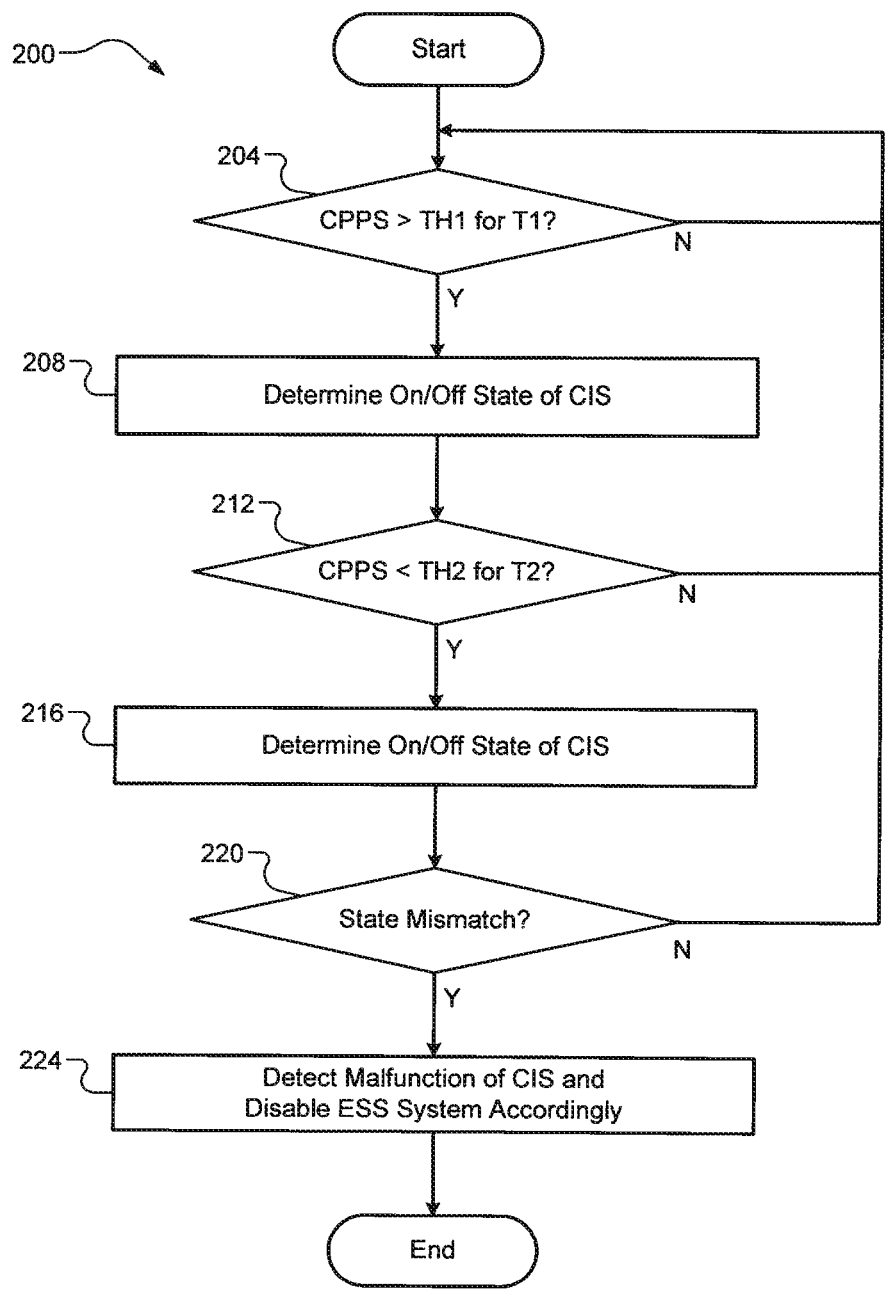
FIGS. 2A-2B are flow diagrams of example diagnostic methods for a clutch interlock switch and a clutch pedal position sensor according to the principles of the present disclosure.
Figure 3A:
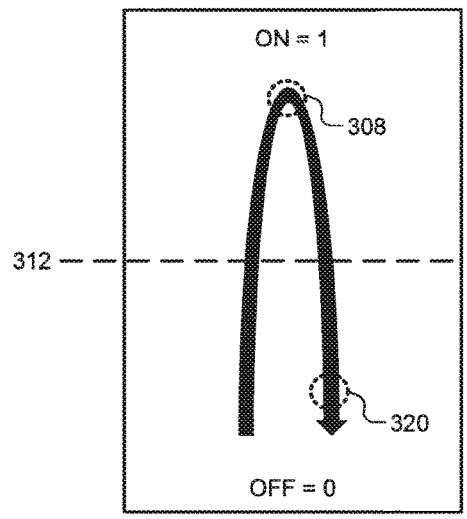
FIGS. 3A-3B are plots of example states of the clutch interlock switch and output voltages of the clutch pedal position sensor and respective diagnostic thresholds according to the principles of the present disclosure.
Figure 3A:
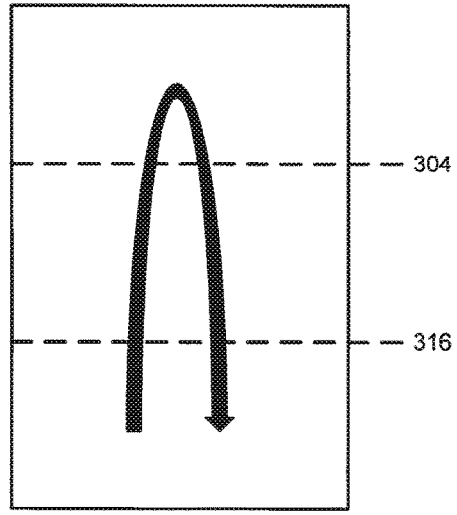

Referring now to FIGS. 2A and 3A, a diagnostic method 200 for the clutch interlock switch 156 and a plot 300 of the on/off state of the clutch interlock switch 156 and the output voltage of the clutch pedal position sensor 152 are illustrated. At 204, the controller 160 determines whether the output voltage of the clutch pedal position sensor (CPPS) 152 is greater than a first threshold (TH1, 304) for a first period (T1). When true, the method 200 proceeds to 208. Otherwise, the method 200 returns to 204. At 208, the controller 160 determines a first on/off state (308) of the clutch interlock switch (CIS) 156. The determined on/off state is relative to an output of the clutch interlock switch 156 (e.g., an output voltage) and an on/off threshold 312. At 212, the controller 160 determines whether the output voltage of the clutch pedal position sensor 152 is less than a second threshold (TH2, 316) for a second period (T2).

It will be appreciated that steps 204 and 212 could be performed in the opposite order. It will also be appreciated that the first and second periods could be the same or could be different and should be sufficiently long to ensure a high degree of likelihood that the clutch pedal 148 is in a particular position. When true, the method 200 proceeds to 216. Otherwise, the method 200 returns to 204. At 216, the controller 160 determines a second on/off state (320) of the clutch interlock switch 156. At 220, the controller 160 determines whether either the first and second on/off states of the clutch interlock switch 156 differ from what is expected. The first on/off state should be on and the second on/off state should be off. When there is no mismatch, the method 200 ends or returns to 204.

When there is a mismatch, however, the controller 160 detects a malfunction of the clutch interlock switch 156 at 224 and disables the ESS system 164 accordingly. It will be appreciated that the controller 160 could wait to set a malfunction flag and disable the ESS system 164 until multiple malfunctions of the clutch interlock switch 156 are detected. Future auto-stops will be prevented because they could result in the engine 104 being inadvertently prevented from restarting. When an auto-stop is in progress, the ESS system 164 is allowed to auto-start the engine 104 provided the manual transmission 120 is in neutral. If the manual transmission 120 is not in neutral, however, the controller 160 could instruct the driver to shift the manual transmission 120 into neutral in order to auto-start the engine 104. The method 200 then ends or returns to 204.

Figure 2B:
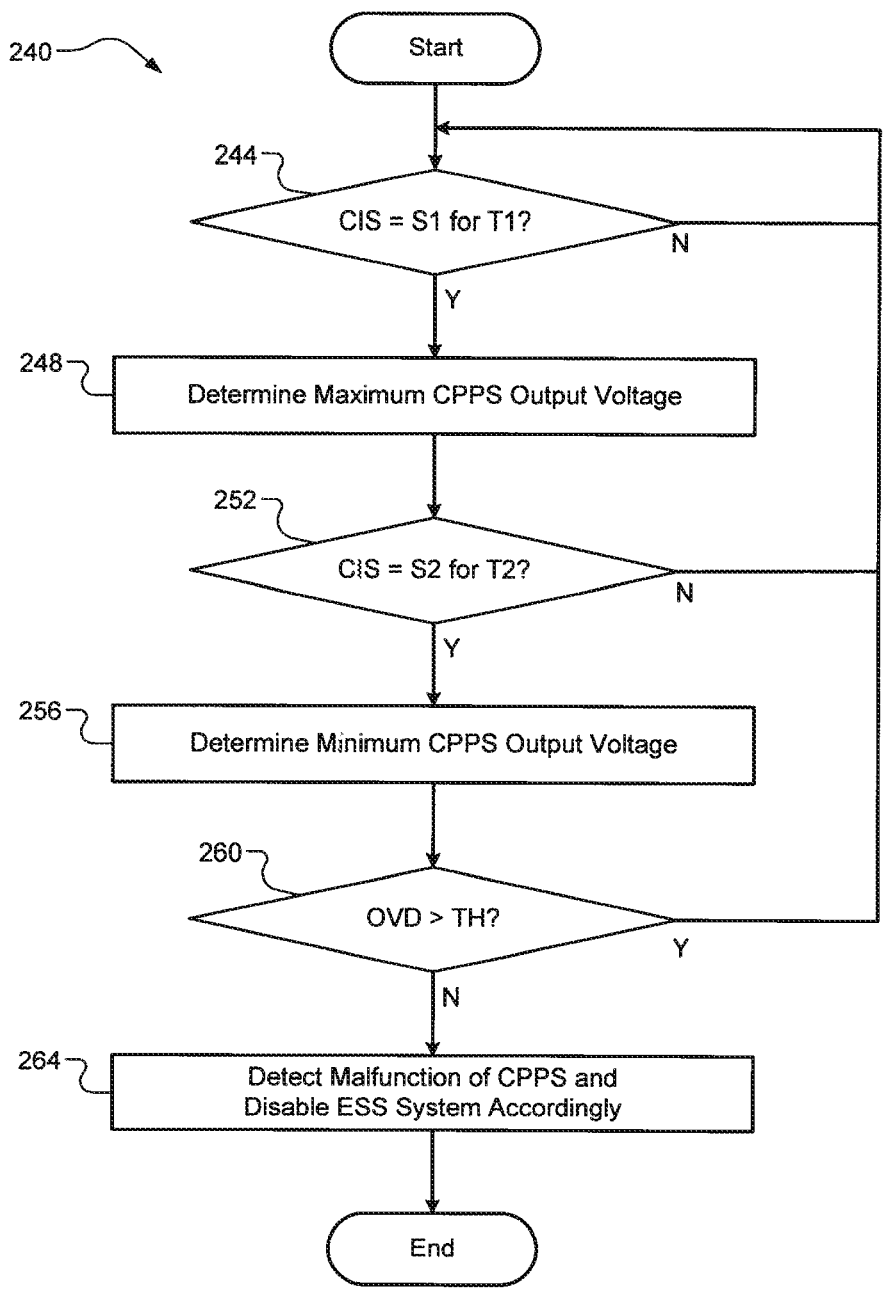
Figure 3B:
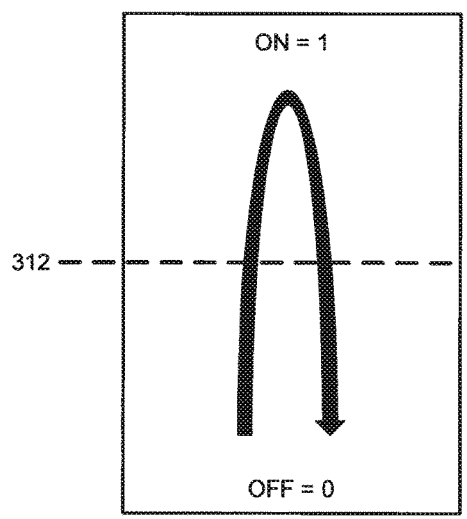
Figure 3B:
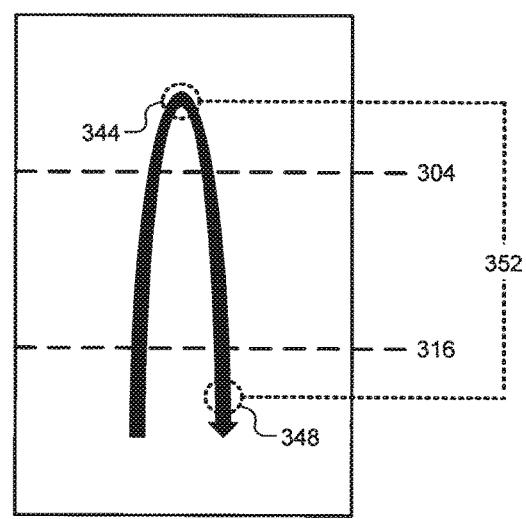

Referring now to FIGS. 2B and 3B, a diagnostic method 240 for the clutch pedal position sensor 152 and a plot 340 of the on/off state of the clutch interlock switch 156 and the output voltage of the clutch pedal position sensor 152 are illustrated. At 244, the controller 160 determines whether the state of the clutch interlock switch 152 has been a first state (S1, e.g., on) for a first period (T1). When true, the method 240 proceeds to 248. Otherwise, the method 240 returns to 244. At 248, the controller 160 determines a maximum output voltage (344) of the clutch pedal position sensor 152, e.g., during the first period. At 252, the controller 160 determines whether the state of the clutch interlock switch 152 has been a different second state (S2, e.g., off) for a second period (T2). When true, the method 240 proceeds to 256. Otherwise, the method 200 returns to 244.

At 256, the controller 160 determines a minimum output voltage (348) of the clutch pedal position sensor 152, e.g., during the second period. At 260, the controller 160 determines whether an output voltage difference (OVD, 352) between the maximum and minimum output voltages of the clutch pedal position sensor is less than a different threshold (TH). When false, the method 240 ends or returns to 244. When true, the controller 160 detects a malfunction of the clutch pedal position sensor 152 at 264 and disables the ESS system 164 accordingly. As previously described with respect to FIGS. 2A and 3A, the controller 160 could wait to set a malfunction flag and disable the ESS system 164 until multiple malfunctions of the clutch pedal position sensor have been detected. The controller 160 could also disable the ESS system 164 in the various manners previously described herein (prevent future auto-stop, allow auto-restart before ESS disable depending on manual transmission being in neutral or not, etc.). The method 240 then ends or returns to 244.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle having an engine with an electronic stop-start (ESS) system and a manual transmission, the control system comprising:
   a clutch pedal position sensor configured to output a voltage indicative of a level of depression of a clutch pedal that is configured to control engagement and disengagement of a clutch assembly of the manual transmission;
   a clutch interlock switch configured to output an on/off state indicative of a position of the clutch pedal relative to a fully-depressed position; and
   a controller configured to:
      correlate the output voltage of the clutch pedal position sensor and the on/off state of the clutch interlock switch to detect a malfunction of the clutch pedal position sensor or the clutch interlock switch; and
      disable the ESS system when the malfunction of the clutch pedal position sensor or the clutch interlock switch is detected.

2. The control system of claim 1, wherein the controller is configured to correlate the output voltage of the clutch pedal position sensor and the on/off state of the clutch interlock switch by:
   determining a first on/off state of the clutch interlock switch when the output voltage of the clutch pedal position sensor exceeds a first voltage threshold indicative of a depressed clutch pedal for a first period;
determining a second on/off state of the clutch-interlock switch when the output voltage of the clutch pedal position sensor falls below a second voltage threshold indicative of a released clutch pedal for a second period; and
detecting the malfunction of the clutch interlock switch when the first detected state of the clutch interlock switch is an off state or the second detected state of the clutch interlock switch is an on state.

3. The control system of claim 1, wherein the controller is configured to correlate the output voltage of the clutch pedal position sensor and the on/off state of the clutch interlock switch by:
determining a maximum output voltage of the clutch pedal position sensor when the clutch interlock switch is in an on state for a first period;
determining a minimum output voltage of the clutch pedal position sensor when the clutch interlock switch is in an off state for a second period;
calculating a difference between the maximum and minimum output voltages of the clutch pedal position sensor; and
detecting the malfunction of the clutch pedal position sensor when the calculated difference is less than a difference threshold.

4. The control system of claim 1, wherein the controller is configured to disable the ESS system prior to an auto-stop of the engine to prevent a failed auto-start of the engine due to the detected malfunction of the clutch pedal position sensor or the clutch interlock switch.

5. The control system of claim 1, wherein when the malfunction of the clutch pedal position sensor or the clutch interlock switch is detected during an auto-stop of the engine and while the manual transmission is in neutral, the controller is configured to disable the ESS system after an auto-start of the engine.

6. The control system of claim 5, wherein when the malfunction of the clutch pedal position sensor or the clutch interlock switch is detected during the auto-stop of the engine and while the manual transmission is not in neutral, the controller is configured to instruct a driver of the vehicle to shift the manual transmission into neutral before the auto-start of the engine and subsequent disabling of the ESS system are performed.

7. The control system of claim 1, wherein the ESS system comprises a belt-driven starter generator (BSG) unit including an electric motor-generator powered by a battery system, wherein the electric motor-generator is coupled to and configured to drive a crankshaft of the engine to start the engine.

8. A diagnostic method for a clutch pedal position sensor and a clutch interlock switch of a vehicle having an engine with an electronic stop-start (ESS) system and a manual transmission, the method comprising:
receiving, by a controller and from a clutch pedal position sensor, an output voltage indicative of a level of depression of a clutch pedal that is configured to control engagement and disengagement of a clutch assembly of the manual transmission;
receiving, by the controller and from a clutch interlock switch, an on/off state indicative of a position of the clutch pedal relative to a fully-depressed position;
correlating, by the controller, the output voltage of the clutch pedal position sensor and the on/off state of the clutch interlock switch to detect a malfunction of the clutch pedal position sensor or the clutch interlock switch; and
disabling, by the controller, the ESS system when the malfunction of the clutch pedal position sensor or the clutch interlock switch is detected.

9. The method of claim 8, wherein correlating the output voltage of the clutch pedal position sensor and the on/off state of the clutch interlock switch further comprises:
determining, by the controller, a first on/off state of the clutch interlock switch when the output voltage of the clutch pedal position sensor exceeds a first voltage threshold indicative of a depressed clutch pedal for a first period;
determining, by the controller, a second on/off state of the clutch-interlock switch when the output voltage of the clutch pedal position sensor falls below a second voltage threshold indicative of a released clutch pedal for a second period; and
detecting, by the controller, the malfunction of the clutch interlock switch when the first detected state of the clutch interlock switch is an off state or the second detected state of the clutch interlock switch is an on state.

10. The method of claim 8, wherein correlating the output voltage of the clutch pedal position sensor and the on/off state of the clutch interlock switch further comprises:
determining, by the controller, a maximum output voltage of the clutch pedal position sensor when the clutch interlock switch is in an on state for a first period;
determining, by the controller, a minimum output voltage of the clutch pedal position sensor when the clutch interlock switch is in an off state for a second period;
calculating, by the controller, a difference between the maximum and minimum output voltages of the clutch pedal position sensor; and
detecting, by the controller, the malfunction of the clutch pedal position sensor when the calculated difference is less than a difference threshold.

11. The method of claim 8, wherein the disabling of the ESS system comprises disabling, by the controller, the ESS system prior to an auto-stop of the engine to prevent a failed auto-start of the engine due to the detected malfunction of the clutch pedal position sensor or the clutch interlock switch.

12. The method of claim 8, wherein the disabling of the ESS system comprises when the malfunction of the clutch pedal position sensor or the clutch interlock switch is detected during an auto-stop of the engine and while the manual transmission is in neutral, disabling, by the controller, the ESS system after an auto-start of the engine.

13. The method of claim 12, wherein the disabling of the ESS system comprises when the malfunction of the clutch pedal position sensor or the clutch interlock switch is detected during the auto-stop of the engine and while the manual transmission is not in neutral, instructing, by the controller, a driver of the vehicle to shift the manual transmission into neutral before the auto-start of the engine and subsequent disabling of the ESS system are performed.

14. The method of claim 8, wherein the ESS system comprises a belt-driven starter generator (BSG) unit including an electric motor-generator powered by a battery system, wherein the electric motor-generator is coupled to and configured to drive a crankshaft of the engine to start the engine.

* * * * *